United States Patent
Schulze et al.

(10) Patent No.: US 11,054,815 B2
(45) Date of Patent: Jul. 6, 2021

(54) APPARATUS FOR COST-EFFECTIVE CONVERSION OF UNSUPERVISED FAULT DETECTION (FD) SYSTEM TO SUPERVISED FD SYSTEM

(71) Applicant: Applied Materials, Inc., Santa Clara, CA (US)

(72) Inventors: Bradley D. Schulze, Phoenix, AZ (US); Suketu Arun Parikh, San Jose, CA (US); Jimmy Iskandar, Fremont, CA (US); Jigar Bhadriklal Patel, Peoria, AZ (US)

(73) Assignee: Applied Materials, Inc., Santa Clara, CA (US)

( * ) Notice: Subject to any disclaimer, the term of this patent is extended or adjusted under 35 U.S.C. 154(b) by 445 days.

(21) Appl. No.: 15/457,016

(22) Filed: Mar. 13, 2017

(65) Prior Publication Data
US 2017/0261971 A1    Sep. 14, 2017

Related U.S. Application Data

(60) Provisional application No. 62/307,272, filed on Mar. 11, 2016.

(51) Int. Cl.
*G05B 23/02*    (2006.01)
(52) U.S. Cl.
CPC ............. *G05B 23/0254* (2013.01); *G05B 2219/45031* (2013.01)
(58) Field of Classification Search
CPC .............. G05B 23/0254; G05B 2219/45031
See application file for complete search history.

(56) References Cited

U.S. PATENT DOCUMENTS

| | | | | |
|---|---|---|---|---|
| 6,449,524 | B1 * | 9/2002 | Miller | H01L 22/20 257/E21.525 |
| 2001/0021217 | A1 * | 9/2001 | Gunther | G06F 1/324 374/178 |
| 2002/0035447 | A1 * | 3/2002 | Takahashi | H01L 22/20 702/188 |
| 2002/0055801 | A1 * | 5/2002 | Reiss | G05B 19/41865 700/111 |
| 2002/0116083 | A1 * | 8/2002 | Schulze | H01L 22/20 700/108 |

(Continued)

*Primary Examiner* — Chuen-Meei Gan
(74) *Attorney, Agent, or Firm* — Patterson + Sheridan, LLP (57) ABSTRACT

Techniques are provided for classifying runs of a recipe within a manufacturing environment. Embodiments monitor a plurality of runs of a recipe to collect runtime data from a plurality of sensors within a manufacturing environment. Qualitative data describing each semiconductor devices produced by the plurality of runs is determined. Embodiments characterize each run into a respective group, based on an analysis of the qualitative data, and generate a data model based on the collected runtime data. A multivariate analysis of additional runtime data collected during at least one subsequent run of the recipe is performed to classify the at least one subsequent run into a first group. Upon classifying the at least one subsequent run, embodiments output for display an interface depicting a ranking sensor types based on the additional runtime data and the description of relative importance of each sensor type for the first group within the data model.

16 Claims, 6 Drawing Sheets

(56) References Cited

U.S. PATENT DOCUMENTS

| | | | |
|---|---|---|---|
| 2003/0055592 A1* | 3/2003 | Buckheit | G01R 31/2894 702/120 |
| 2005/0149297 A1* | 7/2005 | Guralnik | G05B 23/0254 702/189 |
| 2006/0184264 A1* | 8/2006 | Willis | G05B 19/4184 700/108 |
| 2008/0015726 A1* | 1/2008 | Harvey, Jr. | G05B 23/0251 700/110 |
| 2009/0055692 A1* | 2/2009 | Kroupnova | G05B 23/0221 714/57 |
| 2010/0076729 A1* | 3/2010 | Davis | G05B 23/0283 702/184 |
| 2010/0332011 A1* | 12/2010 | Venugopal | H01J 37/32935 700/109 |
| 2012/0130520 A1* | 5/2012 | Parikh | G05B 19/41875 700/96 |
| 2014/0273299 A1* | 9/2014 | Vaid | H01L 22/26 438/14 |
| 2016/0137192 A1* | 5/2016 | Wu | B60W 40/12 701/22 |

* cited by examiner

APPARATUS FOR COST-EFFECTIVE CONVERSION OF UNSUPERVISED FAULT DETECTION (FD) SYSTEM TO SUPERVISED FD SYSTEM

TECHNICAL FIELD

Embodiments of the present disclosure generally relate to fault detection for manufacturing environments, and more particularly, to techniques for determining sensor conditions that most greatly impacted a classification of a current run of a recipe within the manufacturing environment.

BACKGROUND

Manufacturing facilities across many different industries are responsible for producing products that are used in every facet of life. In the case of semiconductor manufacturing, for example, semiconductor manufacturing facilities manufacture products such as microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many others. Further, in recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. In semiconductor manufacturing environments, for example, the semiconductor manufacturing production process is generally divided into two parts, "front-end" and "back-end," both of which use different types of semiconductor manufacturing equipment. Front-end typically refers to wafer fabrication. For example, front-end manufacturing facilities generally start with blank semiconductor wafers (e.g., silicon wafers) and perform various processes, such as photolithography, deposition, etching, cleaning, ion implantation, chemical and mechanical polishing, etc., to fabricate a completed wafer with many semiconductor die on the wafer. Back-end typically refers to the assembly and testing of individual semiconductor devices. For example, once the front-end production process is completed, the completed wafers are transferred to a back-end manufacturing facility, which typically performs functions such as dicing the completed wafer into individual semiconductor die, testing, assembly, packaging, etc.

In today's world of just-in-time manufacturing and shipping, it is becoming increasingly important for manufacturing facilities to be able to accurately predict when they will be able to ship a product so that proper commitments can be made to customers. For this reason, many manufacturing facilities typically perform production planning to attempt to predict if and when they will be able to meet customer demand, plan future equipment need based on demand, and the like.

Further, even in manufacturing facilities that build and implement custom-built planning systems, these custom built planning systems are difficult to maintain and inflexible, which makes it difficult to make modifications to the planning system. In many cases, for example, the manufacturing facility may undergo changes, such as modifications to existing equipment, incorporating new equipment, equipment failures, changes to the facility due to regulatory requirements, etc. Adapting custom-built planning systems to account for such changes can require a level of technical expertise that may not be available to the manufacturing facility (e.g., an end user may not have coding experience, etc.), require a significant time commitment, substantial costs (e.g., due to the complexity of the facilities), etc.

Problems can periodically arise in manufacturing environments that result in faulty runs of the product being manufactured. For example, equipment failures can result in a product being manufactured outside of a designated range of tolerances, rendering the manufactured product inoperable or unsuitable for its intended purposes. However, it can be challenging to detect these problems before a substantial number of runs have completed, resulting in a substantial amount of wasted product and thus a substantial amount of cost.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method. The method includes monitoring a plurality of runs of a recipe for fabricating one or more semiconductor devices within a manufacturing environment to collect run-time data from a plurality of sensors within a manufacturing environment. The method also includes determining qualitative data describing each of the semiconductor devices produced by the plurality of runs of the recipe. Additionally, the method includes characterizing each of the plurality of runs into a respective one of a plurality of groups, based on an analysis of the qualitative data. The method further includes generating a data model, based on the collected runtime data, that describes, for each of the plurality of groups, (i) patterns of sensor data for the respective group and (ii) a relative importance of each of a plurality of sensor types of the plurality of sensors in indicating the respective group. Moreover, the method includes performing a multivariate analysis of additional runtime data collected during at least one subsequent run of the recipe within the manufacturing environment to classify the at least one subsequent run into a first one of the plurality of groups, by determining which pattern of sensor data specified within the data model best fits the additional runtime data. Upon classifying the at least one subsequent run of the recipe into the first group, the method includes outputting for display an interface depicting a ranking of at least two of the plurality of sensor types based on the additional runtime data and the description of relative importance of each of the plurality of sensor types for the first group within the data model.

Another embodiment presented in this disclosure provides a system that includes one or more computer processors and a memory containing computer program code that, when executed by operation of the one or more computer processors, performs an operation. The operation includes monitoring a plurality of runs of a recipe for fabricating one or more semiconductor devices within a manufacturing environment to collect runtime data from a plurality of sensors within a manufacturing environment. The operation also includes determining qualitative data describing each of the semiconductor devices produced by the plurality of runs of the recipe. Additionally, the operation includes characterizing each of the plurality of runs into a respective one of a plurality of groups, based on an analysis of the qualitative data. The operation further includes generating a data model, based on the collected runtime data, that describes, for each of the plurality of groups, (i) patterns of sensor data for the respective group and (ii) a relative importance of each of a plurality of sensor types of the plurality of sensors in indicating the respective group. Moreover, the operation includes performing a multivariate analysis of additional runtime data collected during at least one subsequent run of the recipe within the manufacturing environment to classify the at least one subsequent run into a first one of the plurality of groups, by determining which pattern of sensor data specified within the data model best fits the additional runtime data. Upon classifying the at least one subsequent run of the recipe into the first group, the operation includes outputting for display an interface depicting a ranking of at least two of the plurality of sensor types based on the additional runtime data and the description of relative importance of each of the plurality of sensor types for the first group within the data model.

Yet another embodiment presented in this disclosure provides a non-transitory computer-readable medium containing computer program code that, when executed by operation of one or more computer processors, performs an operation. The operation includes monitoring a plurality of runs of a recipe for fabricating one or more semiconductor devices within a manufacturing environment to collect runtime data from a plurality of sensors within a manufacturing environment. The operation also includes determining qualitative data describing each of the semiconductor devices produced by the plurality of runs of the recipe. Additionally, the operation includes characterizing each of the plurality of runs into a respective one of a plurality of groups, based on an analysis of the qualitative data. The operation further includes generating a data model, based on the collected runtime data, that describes, for each of the plurality of groups, (i) patterns of sensor data for the respective group and (ii) a relative importance of each of a plurality of sensor types of the plurality of sensors in indicating the respective group. Moreover, the operation includes performing a multivariate analysis of additional runtime data collected during at least one subsequent run of the recipe within the manufacturing environment to classify the at least one subsequent run into a first one of the plurality of groups, by determining which pattern of sensor data specified within the data model best fits the additional runtime data. Upon classifying the at least one subsequent run of the recipe into the first group, the operation includes outputting for display an interface depicting a ranking of at least two of the plurality of sensor types based on the additional runtime data and the description of relative importance of each of the plurality of sensor types for the first group within the data model.

Example Embodiments

Production planning and management for manufacturing facilities (or factories) is a very complex and time-consuming process. For example, production flows within manufacturing facilities are often uncertain, loading within the manufacturing facilities can change frequently (e.g., due to equipment failures, processing speeds of different tools, etc.), different products can require different amounts of resources, and so on. Additionally, problems can occur within the manufacturing environment that result in faulty, unsuitable or otherwise less desirable manufactured products. For example, worn parts within the manufacturing equipment, gas leaks, and the like can all negatively impact the products being manufactured. However, it can be difficult to detect these problems before a substantial amount of defective products have been manufactured, resulting in a substantial amount of wasted time and resources.

Additionally, once an engineer determines that a problem has occurred within the manufacturing environment resulting in defective products being manufactured, it is frequently a difficult and time-consuming process to determine the source of the problem. That is, because modern manufacturing environments are highly complex systems that include numerous interworking parts, the number of different problems that can occur is substantial and determining which of the vast number of different potential problems is actually occurring is a challenging task that is currently performed manually by a technician within the manufacturing environment.

As such, embodiments provide techniques for classifying runs of a recipe into one of multiple groups (e.g., good run, faulty run, etc.). One embodiment includes monitoring a plurality of runs of a recipe within a manufacturing environment to collect runtime data from a plurality of sensors. Examples of such sensors include, without limitation, temperature sensors, gas detection sensors, laser and fiber optic sensors, camera sensors, and so on. Generally, any form of sensor suitable for collecting data within a manufacturing environment can be used, consistent with the present disclosure.

Additionally, embodiments can determine qualitative data characterizing each of the plurality of runs into a respective one of a plurality of groups. For instance, products manufactured during each of the plurality of runs could be evaluated (e.g., by performing a number of diagnostic tests on the products) and, based on the evaluation, the runs could be classified as good or faulty runs. For example, if a particular run resulted in products that failed one or more diagnostic tests, the run could be classified as a faulty run. Of note, while examples provided herein refer to good and faulty classification groups for runs of a recipe, such examples are provided for illustrative purposes only. More generally, any suitable number of classifications for runs can be provided, consistent with the functionality described herein.

Embodiments can then generate a data model, based on the collected runtime data. Such a data model could describe, for each of the plurality of groups, patterns of sensor data for the respective group. That is, the data model could describe sensor values (e.g., a threshold value for a particular sensor or type of sensor) and/or patterns of sensor values (e.g., a rate of change for a particular sensor or type of sensor) for each group that, when satisfied, indicate that a current run should be classified into the corresponding group. As an example, the data model could specify that a particular temperature sensor within the manufacturing environment reaching or exceeding a predefined level is indicative of a particular classification of run (e.g., a faulty run).

Additionally, the data model could describe a relative importance of each of a plurality of sensor types of the plurality of sensors in indicating the respective group. For example, the data model could indicate that while the temperature sensor data reaching or exceeding the predefined level is indicative of a particular classification, a gas sensor detecting a gas leak of a particular type of gas is greatly indicative of the particular classification.

Embodiments can then use the generated data model to classify subsequent runs of the recipe within the manufacturing environment into one of the plurality of groups. For instance, embodiments can collect additional runtime data during a subsequent run of the recipe and can compare the additional runtime data against the data model to select the most appropriate group to classify the subsequent run into. In doing so, embodiments can take into account the various weights for each type of sensor specified within the data model. Doing so enables embodiments to weight the data collected from the various sensors appropriately, and thereby improves the accuracy of the classification.

In one embodiment, the runtime sensor data is separated by the step of the recipe during which the data was collected. That is, each recipe can include multiple distinct steps that are executed in order to manufacture the product, and embodiments can record which step of the recipe a given unit of data was collected during. Embodiments could collect sensor data from the plurality of sensors during each step of the recipe, and could compare the collected sensor data with data within the model for the corresponding step of the recipe in order to classify the current run. For example, the data model could specify a temperature threshold for a particular sensor during a first step of the recipe and could specify a much greater temperature threshold for the same sensor during a later step of the recipe. By taking into account which step of the recipe the current production run is executing, embodiments can more accurately classify the current run of the recipe.

Note that, for the sake of convenience, many of the following embodiments are described with reference to semiconductor manufacturing facilities (e.g., front-end and back-end facilities) as reference examples of types of manufacturing environments that may undergo planning using the techniques presented herein. Note, however, that the techniques presented herein can also be applied to other types of manufacturing environments (e.g., in other industries).

Figure 1:
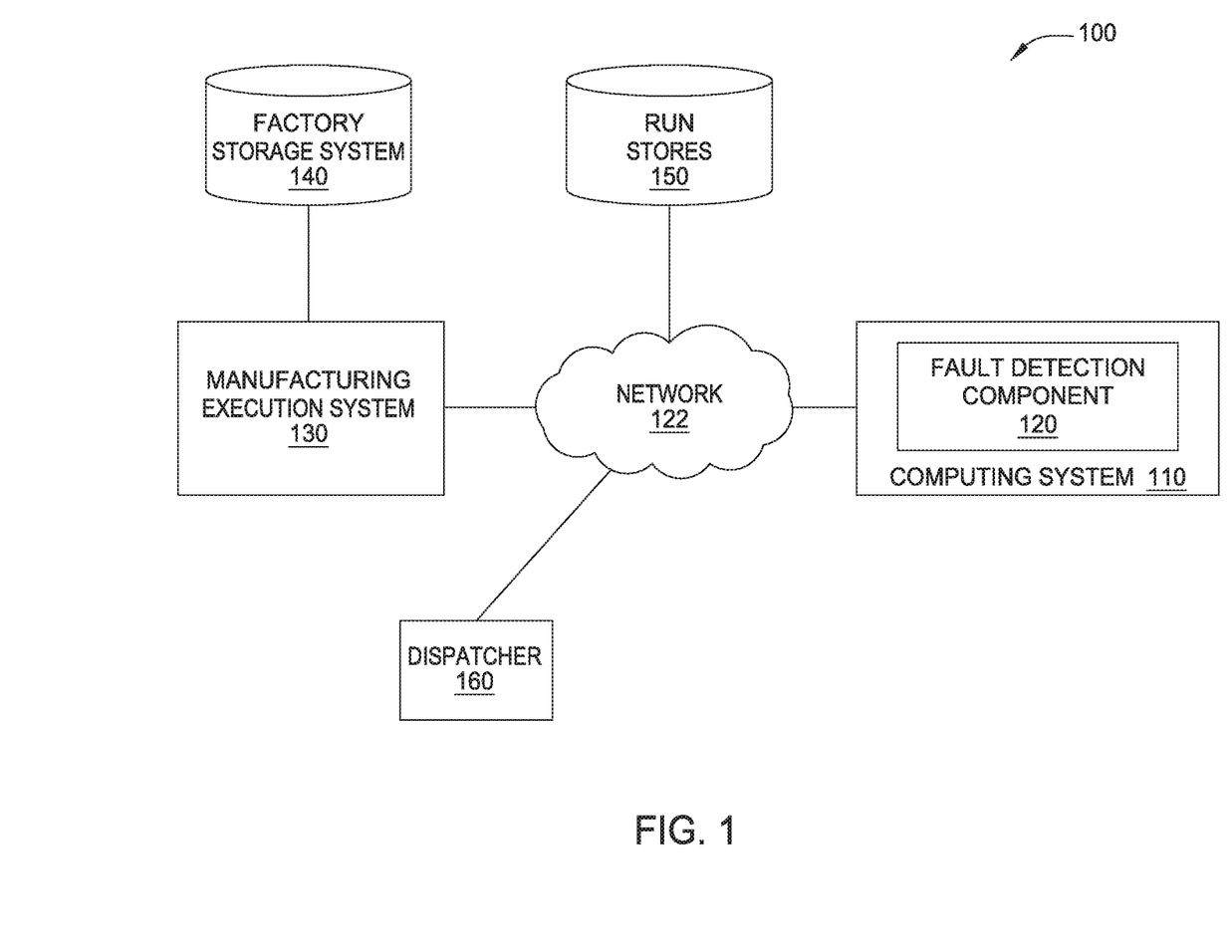
FIG. 1 illustrates a block diagram of an architecture of a manufacturing environment configured with a fault detection component, according to one embodiment described herein.

FIG. 1 is a block diagram illustrating an architecture of a manufacturing environment (or system) 100, in which aspects of the present disclosure may be practiced. For example, in one embodiment, the manufacturing environment 100 is an example of a semiconductor front-end or back-end manufacturing facility. As shown, the manufacturing environment 100 includes a computing system 110, manufacturing execution system (MES) 130, factory storage system 140, dispatcher 160 and run stores 150 connected via a network 122. In general, the network 122 can be a wide area network (WAN), local area network (LAN), wireless LAN (WLAN), etc. The factory storage system 140 and run stores 150, in general, can be any kind of storage system, including, for example, relational and/or hierarchal databases, distributed filing systems, etc. In one embodiment, the computing system 110 and MES 130 can be any kind of physical computing system having a network interface, such as a desktop computer, laptop computer, mobile device, tablet computer, server computing systems, gateway computers, and the like.

The MES 130 is generally configured to manage and control the operation of a current work-in-progress (WIP) within the manufacturing environment 100. For a front-end semiconductor manufacturing factory, the MES 130 can control one or more processes related to the fabrication of semiconductor wafers. For a back-end semiconductor manufacturing factory, the MES 130 can control one or more processes related to cutting, assembly, and testing of semiconductor die on the wafers. The MES 130 can monitor the operation of one or more tools (or equipment) operating in the manufacturing environment 100, receive data directly from the tools and/or a monitoring system, analyze the received data, and/or collect the data. In one embodiment, the MES 130 can store the data (received from the tools) into factory storage system 140. Such information stored in the factory storage system 140 can include information regarding the current WIP, number of tools in the manufacturing environment, operating parameters (e.g., processing speeds, capacity load, and the like) of the tools, manufacturing data, and other metadata characteristic of the manufacturing environment 100.

A management system (not shown) can be configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 140.

As shown, the computing system 110 includes a fault detection component 120. The fault detection component 120 is generally configured to generate a data model by analyzing historical recipe run data (e.g., stored within factory storage system 140) and to use such a data model for classifying runs of a recipe into one of multiple groups (e.g., good, faulty, etc.). For instance, the fault detection component 120 could monitor a plurality of runs of a recipe within a manufacturing environment to collect runtime data from a plurality of sensors, e.g., temperature sensors, gas detection sensors, laser and fiber optic sensors, camera sensors, and so on.

Additionally, the fault detection component 120 can determine qualitative data characterizing each of the plurality of runs into a respective one of a plurality of groups. For instance, the fault detection component 120 could receive evaluation data (e.g., the results of a number of diagnostic tests performed on the products) for products manufactured during each of the plurality of runs and, based on the evaluation, the fault detection component 120 could classify each of the runs as good or faulty runs. For example, a user could access a user interface provided by the fault detection component 120 and could indicate that a particular run resulted in products that failed one or more diagnostic tests and thus the run is classified as a faulty run. Of note, while examples provided herein refer to good and faulty classification groups for runs of a recipe, such examples are provided for illustrative purposes only. More generally, any suitable number of classifications for runs can be provided, consistent with the functionality described herein.

The fault detection component 120 could then analyze the collected runtime data and the qualitative data to generate a data model. Such a data model could describe, for each of the plurality of groups, patterns of sensor data indicative of the respective group. That is, the data model could describe sensor values (e.g., a threshold value for a particular sensor or type of sensor) and/or patterns of sensor values (e.g., a rate of change for a particular sensor or type of sensor) for each group that, when satisfied, indicate that a current run should be classified into the corresponding group. As an example, the data model could specify condition for multiple sensors within the manufacturing environment that, when satisfied by sensor readings from a current run, are indicative of a particular classification for the current run (e.g., a faulty run). Additionally, the data model could describe a relative importance of each of a plurality of sensor types of the plurality of sensors in indicating the respective group. For example, the data model could indicate that while the temperature sensor data reaching or exceeding the predefined level is indicative of a particular classification, a gas sensor detecting a gas leak of a particular type of gas is greatly indicative of the particular classification.

The fault detection component 120 can then use the generated data model to classify subsequent runs of the recipe within the manufacturing environment into one of the plurality of groups. For instance, the fault detection component 120 can access additional runtime data collected during a subsequent run of the recipe (e.g., by querying factory storage system 140) and can compare the additional runtime data against the data model to select the most appropriate group to classify the subsequent run into. In doing so, the fault detection component 120 can take into account the various weights for each type of sensor specified within the data model. Doing so enables embodiments to weight the data collected from the various sensors appropriately, and thereby improves the accuracy of the classification.

In one embodiment, the fault detection component 120 is configured to consider the step of the recipe during which the additional runtime data was collected when comparing the additional runtime data with values in the data model. That is, each recipe can include multiple distinct steps that are executed in order to manufacture the product, and the fault detection component 120 (or a monitoring system within the manufacturing environment 100) can record which step of the recipe a given unit of data was collected during. The fault detection component 120 could then collect sensor data from the plurality of sensors during each step of the recipe, and could compare the collected sensor data with data within the model for the corresponding step of the recipe in order to classify the current run. For example, the data model could specify a rate of temperature increase for a particular sensor during a particular step of the recipe is indicative of a particular classification, and could specify a much lesser rate of temperature increase for the same sensor during a later step of the recipe is indicative of the same classification. As such, the fault detection component 120 could classify a current run into a different group, depending on the step during which a particular sensor reading was taken. In other words, a particular rate of temperature increase detected by a particular sensor could be indicative of a good run during a certain step of the recipe, while the same rate of temperature increase detected by the same sensor could be indicative of a faulty run during another step of the same recipe. By taking into account which step of the recipe the current production run is executing, embodiments can more accurately classify the current run of the recipe.

As discussed above, once a problem is detected, it can be difficult for a technician to ascertain the cause of the problem (e.g., due to the complexity of modern manufacturing environments). Moreover, it is frequently the case that until the problem is resolved, manufacturing within the manufacturing environment must be halted, as otherwise the resulting manufactured products may continue to be faulty (e.g., defective, unsuitable for their intended purpose, etc.). However, it is also undesirable for the manufacturing environment to remain idle, as the reduced amount of manufactured products result in a substantial cost. As such, it is desirable for problems to not only be detected quickly but to be resolved quickly. Accordingly, in one embodiment, the fault detection component 120 is configured to classifying a subsequent run of the recipe into a particular group (e.g., good run, faulty run, etc.) and, upon doing so, to determine a respective likelihood that each sensor within the plurality of sensors contributed to the classification. As an example, the fault detection component 120 could analyze the sensor values collected for the subsequent run relative to the patterns of sensor values within the data model, while taking into account the relative weights for each pattern of sensor values, to determine which sensor values most contributed to the subsequent run's determined classification. The fault detection component 120 could then output for display an interface depicting a ranking of the sensors determined to most likely have contributed to the determined classification.

As an example, the fault detection component 120 could determine that a value(s) collected from a gas leak sensor within the manufacturing environment greatly contributed to the subsequent run being classified as a faulty run (e.g., based on the sensor value matching the pattern of sensor values specified for faulty runs within the data models as well as the corresponding weight of the gas leak sensor specified within the data model). Continuing the example, the fault detection component 120 could determine that a particular temperature sensor value contributed the second most to the classification as a faulty run, and so on. By outputting an interface listing the sensor readings which contributed the most to the classification, the fault detection component 120 can enable engineers within the manufacturing environment to more easily pinpoint the cause of a particular classification (e.g., a faulty run).

Figure 2:
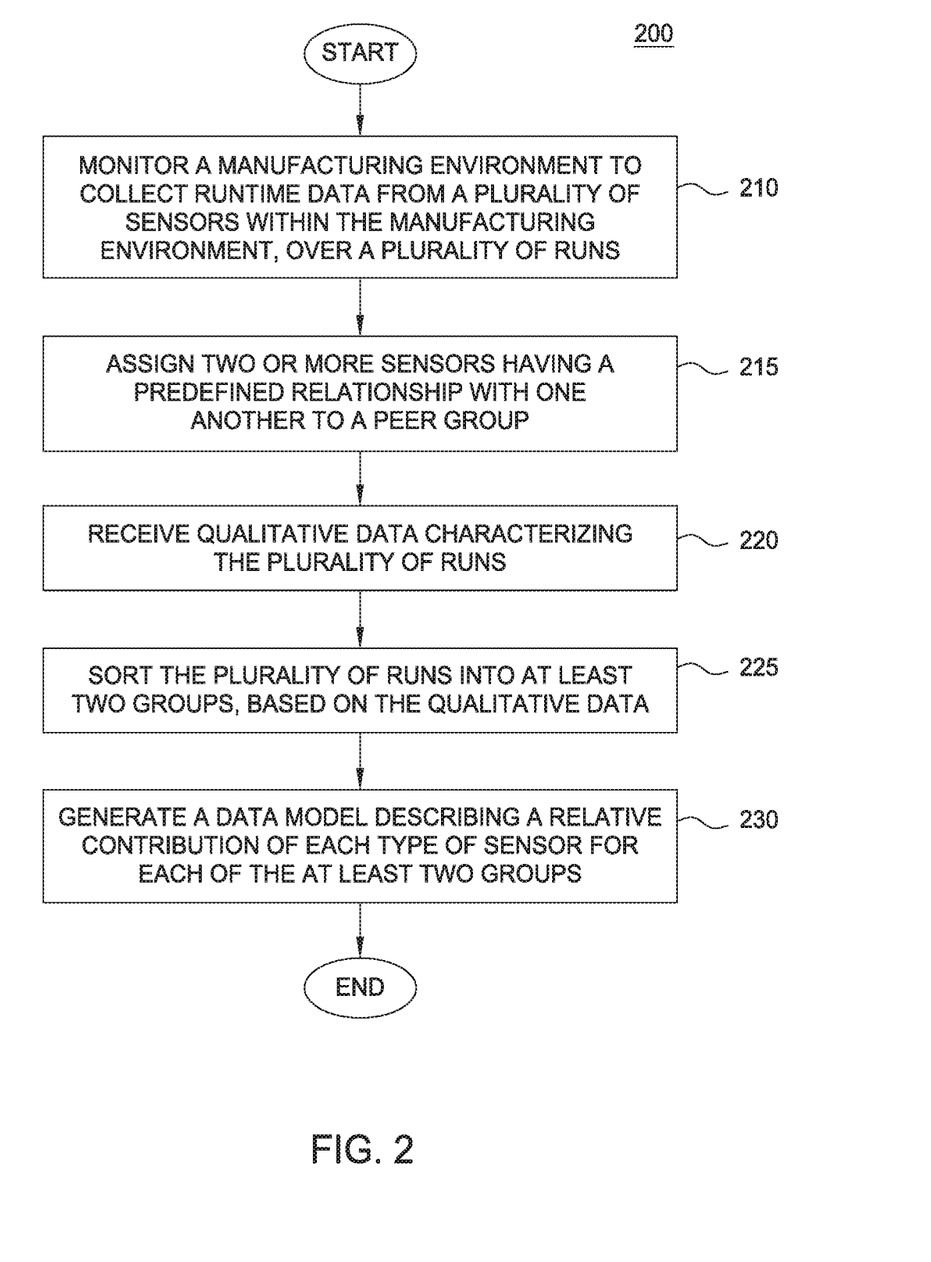
FIG. 2 is a flow diagram illustrating a method of generating a data model for use in detecting faulty runs within a manufacturing environment, according to one embodiment described herein.

FIG. 2 is a block diagram illustrating a method of generating a data model for use in detecting faulty runs within a manufacturing environment, according to one embodiment described herein. As shown, the method 200 begins at block 210, where the fault detection component 120 monitors a manufacturing environment to collect runtime data from a plurality of sensors over a plurality of runs of a recipe. The fault detection component 120 assigns two or more of the sensors to a peer group (block 215). Generally, a peer group represents a group of sensors having a predefined relationship to one another. For instance, particular sensors could be assigned to a peer group when the data collected from the sensors is correlated, due to conditions within the manufacturing environment. As an example, multiple temperature sensors located within proximity of one another in the manufacturing environment could be assigned to a peer group, as changes in temperature detected by one of the sensors would also be detected by the other sensors in the group. As another example, a particular sensor that measures rotations per minute (RPMs) and a particular temperature sensor could be assigned to a peer group, as an increase in RPMs detected by the RPM sensor could be correlated with an increase in temperature detected by the particular temperature sensor.

The fault detection component 120 further receives qualitative data describing each product (e.g., a semiconductor) produced by the plurality of runs and characterizes each of the plurality of runs into one of a plurality of groups, based on an analysis of the qualitative data (block 220). For example, a number of diagnostic tests could be performed on products resulting from one of the plurality of runs and the results of these tests could determine how the run is classified. As an example, the fault detection component 120 could perform a metrology inspection of a semiconductor produced by the run and could determine whether the results of the metrology inspection are within a predefined set of tolerances. If the fault detection component 120 determines the results are outside of the predefined tolerances, the fault detection component 120 could classify the run as a faulty run. As another example, the fault detection component 120 could determine an amount of time needed to complete the run and, if the amount of time exceeds a predefined threshold amount of time, the fault detection component 120 could classify the run as a faulty run. Generally, any number of tests can be performed to determine the qualitative data for the run, and if any product(s) from the run fails any of the diagnostic tests, the fault detection component 120 could classify the run as a faulty run. In one embodiment, the fault detection component 120 provides a user interface through which engineers can specify qualitative data characterizing the runs.

The fault detection component 120 sorts the plurality of runs into at least two groups using the qualitative data (block 225). For example, the fault detection component 120 could divide the plurality of runs into a group of good runs and a group of faulty runs. Of course, such an example is provided for illustrative purposes only, and more generally any number of different classifications of different levels of granularity can be used, consistent with the functionality described herein.

Upon sorting the runs into the at least two groups, the fault detection component 120 generates a data model describing a relative contribution of each sensor type for classifying runs into each of the groups (block 230), and the method 200 ends. For example, the fault detection component 120 could analyze the collected runtime data to determine that a particular temperature sensor exceeding a threshold level of temperature is highly indicative of a run being a faulty run, and the fault detection component 120 could further determine that variations in another temperature sensor are only somewhat likely to indicate the run is a faulty run. In one embodiment, the fault detection component 120 is configured to further consider which step of the recipe the sensor values were detected during. For example, a relatively higher temperature reading from a particular sensor could be normal during one step of the recipe, while the same temperature reading from the particular sensor could be indicative of a faulty run during another step of the recipe. Doing so enables the fault detection component 120 to more accurately classify subsequent runs into an appropriate group using the generated data model.

Figure 3:
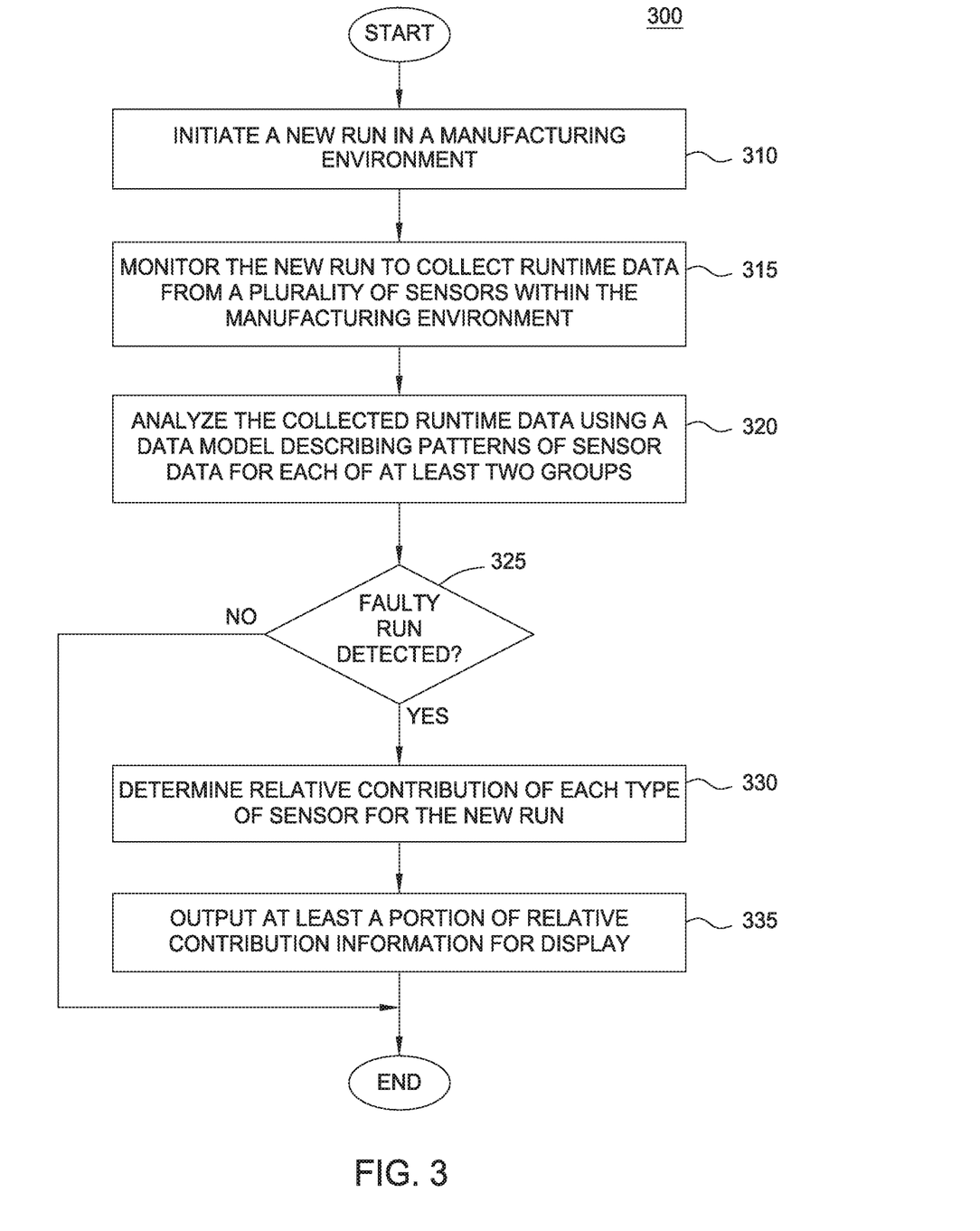
FIG. 3 is a flow diagram illustrating a method of detecting a faulty run within a manufacturing environment through the use of a data model, according to one embodiment described herein.

FIG. 3 is a block diagram illustrating a method of detecting a faulty run within a manufacturing environment through the use of a data model, according to one embodiment described herein. As shown, the method 300 begins at block 310, where a dispatcher (e.g., dispatcher 160) initiates a new run of a recipe within a manufacturing environment. The fault detection component 120 monitors the new run to collect runtime data from a plurality of sensors within the manufacturing environment (block 315).

The fault detection component 120 then analyzes the collected runtime data using a generated data model describing patterns of sensor data for at least two groups (e.g., a model generated according to the method 200 shown in FIG. 2 and discussed above). If the fault detection component 120 classifies the initiated run and determines that a faulty run is detected (block 325), the fault detection component 120 determines a relative contribution of each sensor to the classification as a faulty run (block 330). As discussed above, the data model can specify not only patterns of sensor data corresponding to the various classification groups, but the data model can further specify weights for each of the patterns that indicate how much detecting an occurrence of the pattern indicates that the subsequent run belongs to the corresponding classification. Moreover, the fault detection component 120 can consider a step of the recipe during which each sensor value in the collected runtime data was collected in determining the classification and the relative contributions of the sensors. The fault detection component 120 then outputs at least a portion of the relative contribution information for display (block 335), and the method 300 ends. Doing so enables an engineer within the manufacturing environment to more quickly ascertain the source of the problem and thus enables the problem to be remedied more efficiently. On the other hand, if the fault detection component 120 determines that a faulty run was not detected, the method 300 ends (e.g., at which point, a subsequent run can be initiated and monitored by the fault detection component 120).

Figure 4:
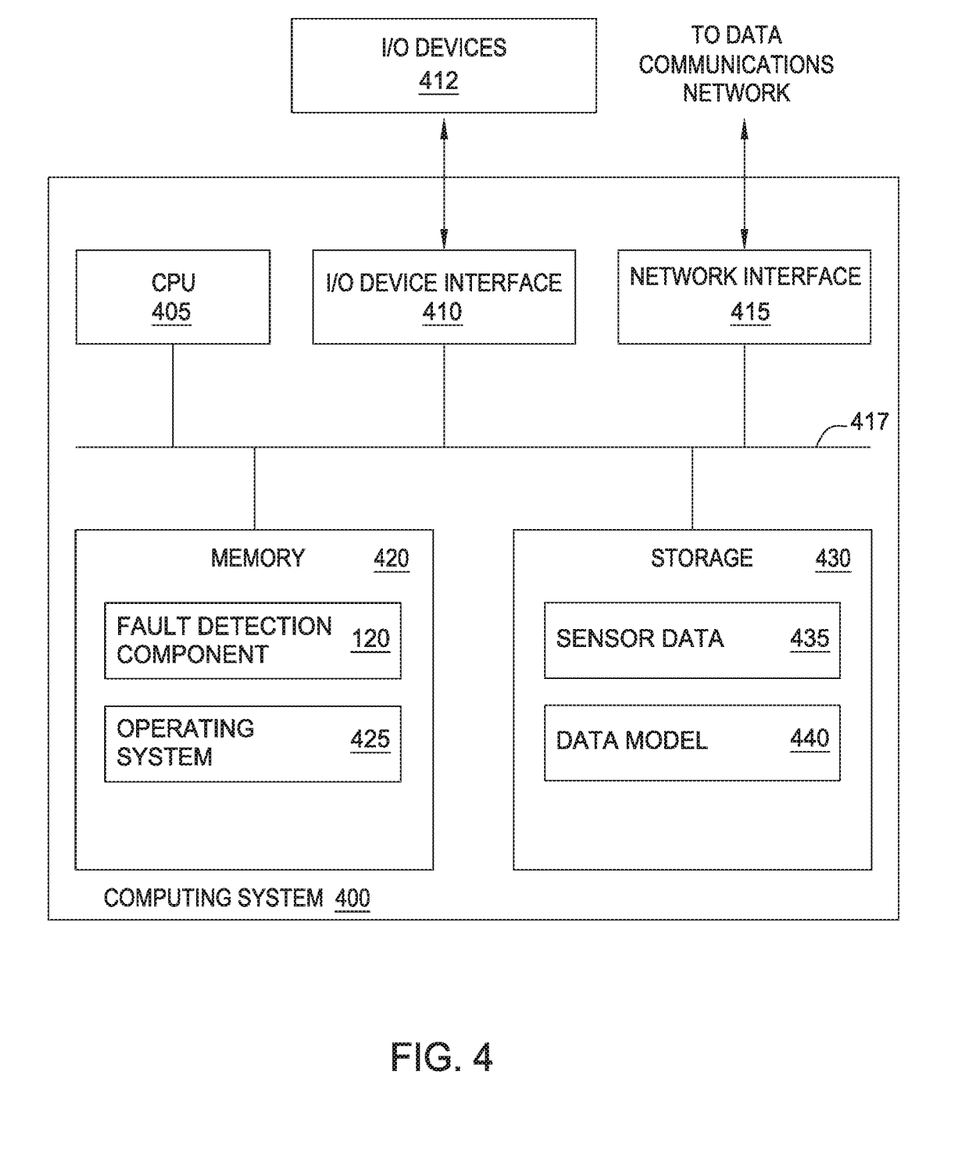
FIG. 4 illustrates a computing system configured with a fault detection component, according to one embodiment described herein.

FIG. 4 illustrates a computing system 400 configured to execute a fault detection component, according to one embodiment. As shown the computing system 400 includes, without limitation, a central processing unit (CPU) 405, a network interface 415, a memory 420, and storage 430, each connected to a bus 417. The computing system 400 may also include an I/O device interface 410 connecting I/O devices 412 (e.g., keyboard, mouse, and display devices) to the computing system 400. Further, in context of this disclosure, the computing elements shown in the computing system 400 may correspond to a physical computing system (e.g., a system in a data center) or may be a virtual computing instance executing within a computing cloud.

Generally, the CPU 405 retrieves and executes programming instructions stored in the memory 420 as well as stores and retrieves application data residing in the memory 420. The interconnect 417 is used to transmit programming instructions and application data between CPU 405, I/O devices interface 410, storage 430, network interface 415, and memory 420. Note, CPU 405 is included to be representative of a single CPU, multiple CPUs, a single CPU having multiple processing cores, and the like. Memory 420 is generally included to be representative of a random access memory. Storage 430 may be a disk drive storage device. Although shown as a single unit, storage 430 may be a combination of fixed and/or removable storage devices, such as fixed disc drives, removable memory cards, or optical storage, network attached storage (NAS), or a storage area-network (SAN).

Illustratively, the memory 420 includes a fault detection component 120 and an operating system 425. The storage 430 includes sensor data 435 and a data model 440. In one embodiment, the fault detection component 120 is configured to classify runs of a recipe within a manufacturing environment. The fault detection component 120 could monitor a plurality of runs of the recipe within the manufacturing environment to collect sensor data 435 from a plurality of sensors. The fault detection component 120 can further determine qualitative data characterizing each of the plurality of runs into a respective one of a plurality of groups. The fault detection component 120 can then generate the data model 440, based on the sensor data 435. For instance, the data model could describe, for each of the plurality of groups, (i) patterns of sensor data indicative of the respective group and (ii) a relative importance of each of a plurality of sensor types of the plurality of sensors in indicating the respective group. The fault detection component 120 could then classify at least one subsequent run of the recipe within the manufacturing environment into a first one of the plurality of groups, using the generated data model 440 and additional runtime data collected during the at least one subsequent run.

Figure 5:
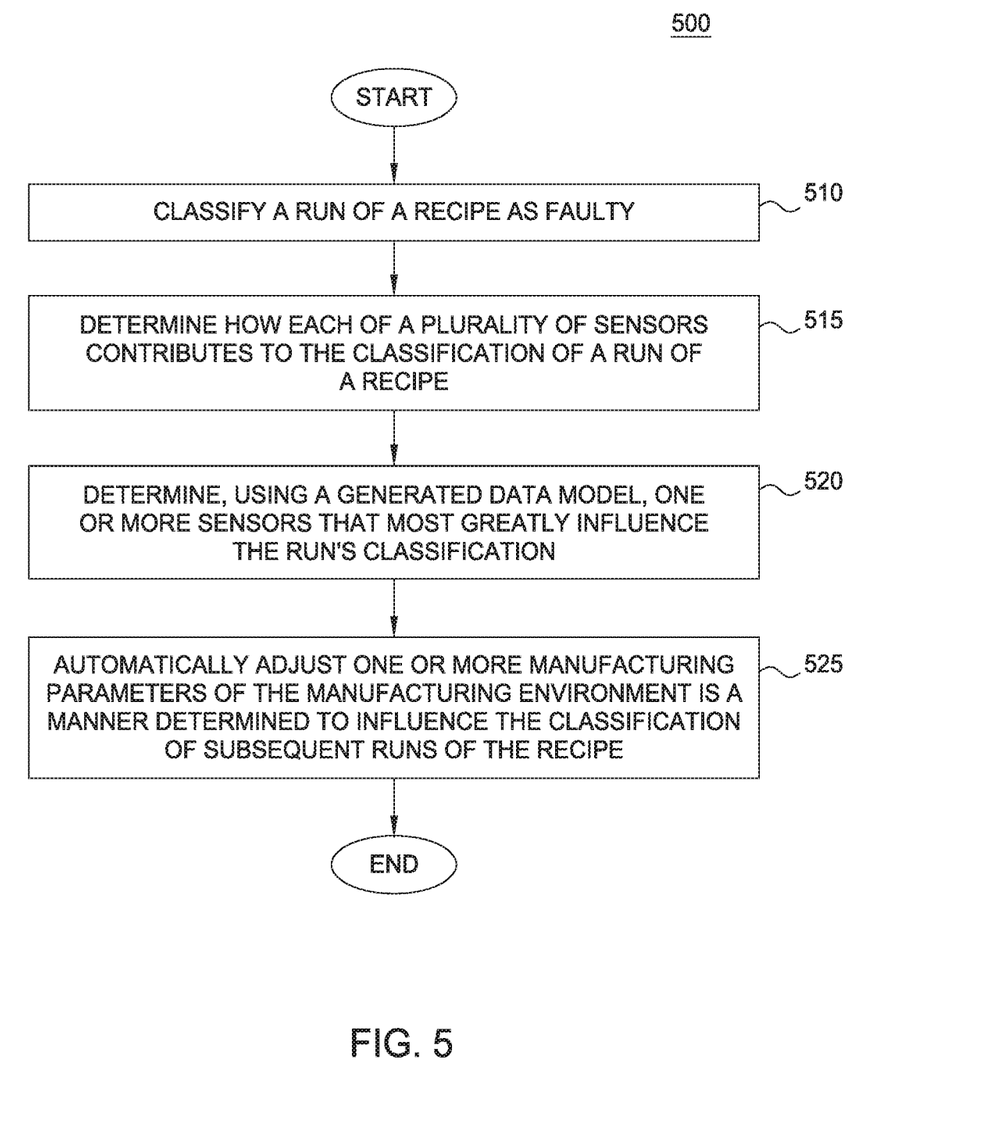
FIG. 5 is a flow diagram illustrating a method of adjusting manufacturing parameters of a manufacturing environment, according to one embodiment described herein.

FIG. 5 is a flow diagram illustrating a method of adjusting manufacturing parameters of a manufacturing environment, according to one embodiment described herein. As shown, the method 500 begins at block 510, where the fault detection component 120 classifies a run of a recipe as a faulty run. As discussed above, the fault detection component 120 can be configured to classify runs into one of various groups, including, e.g., a good run, a faulty run, etc. The fault detection component 120 further determines how each of a plurality of sensors (and peer groups of sensors) contributes to the classification of a run (block 515). In addition to considering patterns of sensor values for individual sensors, the fault detection component 120 can be configured to detect patterns of sensor values for each determined peer group. The fault detection component 120 determines, using a generated data model, one or more sensors (or peer groups of sensors) that mostly greatly influence the run's classification (block 520). For instance, the fault detection component 120 could generate an interface to specify a ranking of each of the sensors and peer groups of sensors, based on a determined measure of influence of each sensor and peer group of sensors to the determined classification of the run. Doing so further facilitates the efficient diagnosis of the source of the problem by engineers within the manufacturing environment.

The fault detection component 120 then automatically adjusts one or more manufacturing parameters of the manufacturing environment in order to influence the classification of subsequent runs of a recipe (block 525), and the method 500 ends. That is, if runs of a recipe are being classified as faulty runs, the fault detection component 120 could determine one or more parameters of the manufacturing environment to adjust in order to cause future runs of the recipe to be classified as non-faulty runs. For example, the fault detection component 120 could use the generated data model to determine a sensor or a group of sensors (e.g., a peer group of sensors having a predefined relationship with one another) that most greatly influenced the run's classification as a faulty run. The fault detection component 120 could then determine one or more parameters of the manufacturing environment to adjust, in order to affect future readings from the determined sensor or group of sensors. For example, the fault detection component 120 could determine that patterns of data collected from a particular peer group of sensors most greatly influence the run's classification as a faulty run, and the fault detection component 120 could further determine that a particular auto-calibration operation has historically influenced the particular peer group of sensors in such a way that the data collected from the particular peer group of sensors would be classified as a non-faulty run. The fault detection component 120 could then cause an auto-calibration open to be performed for one or more pieces of manufacturing equipment within the manufacturing environment, responsive to the fault detection component 120 determining that the particular auto-calibration operation has historically influenced the readings from the determined sensor or group or sensors.

As another example, the fault detection component 120 could automatically initiate performance of a maintenance operation within the manufacturing environment, determined to influence subsequent data collected by the determined sensor or group of sensors. For example, the fault detection component 120 could initiate a season and clean operation to re-tune a fabrication chamber within the manufacturing environment, where the fault detection component 120 processes data indicating that the season and clean operation has been shown to influence the determined sensor or group of sensors in the past. As another example, the fault detection component 120 could determine a manual maintenance operation that is known to influence the determined sensor or group of sensors, e.g., fixing faulty hardware and/or replacing a part(s) within the manufacturing environment, and the fault detection component 120 could generate a maintenance ticket for the manual maintenance operation to be performed.

Figure 6:
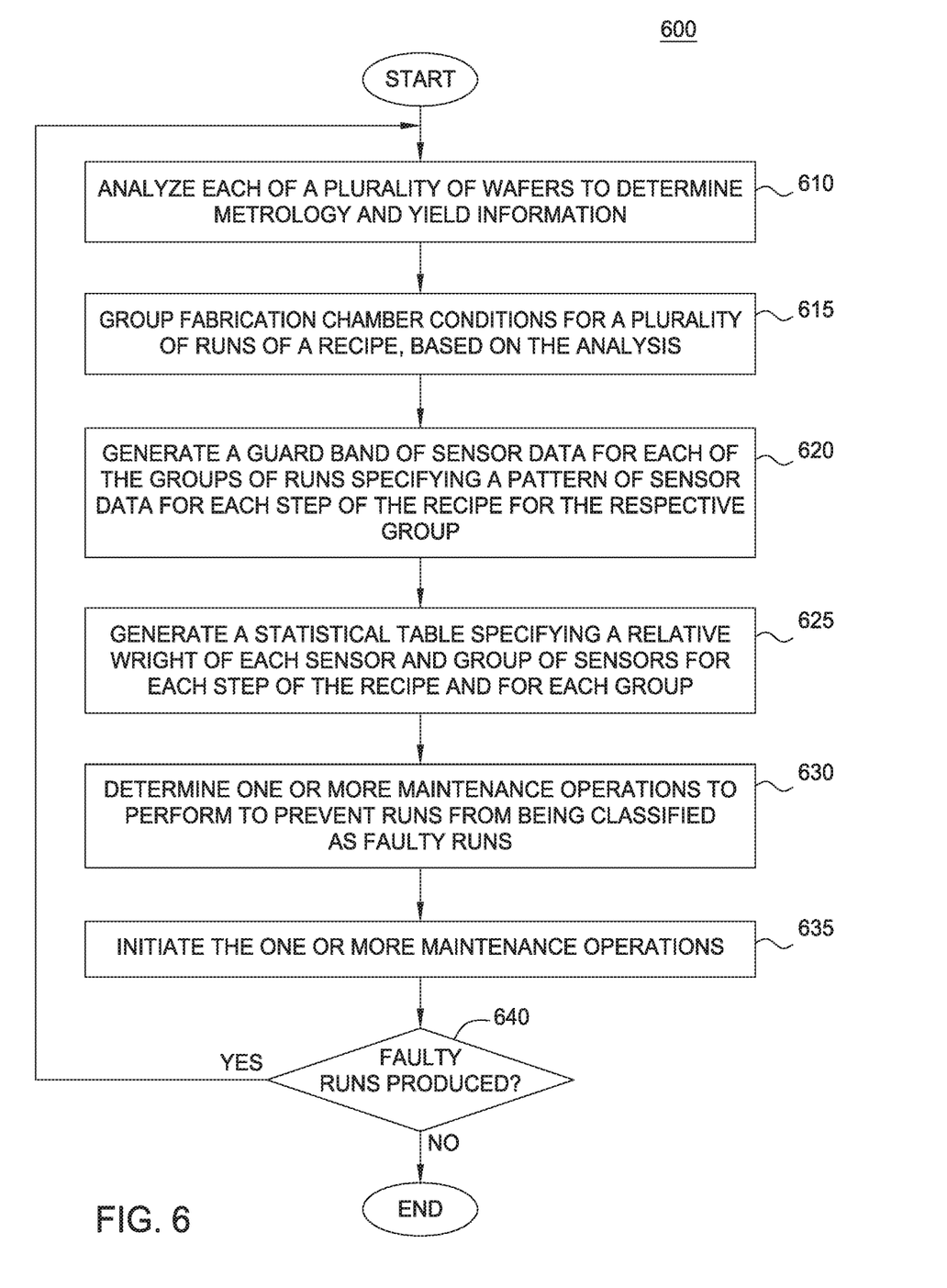
FIG. 6 is a flow diagram illustrating a method of managing a manufacturing environment, according to one embodiment described herein.

FIG. 6 is a flow diagram illustrating a method of managing a manufacturing environment, according to one embodiment described herein. As shown, the method 600 begins at block 610, where the fault detection component 120 analyzes each of a plurality of wafers produced during a plurality of runs to determine metrology and yield information. The fault detection component 120 groups fabrication chamber conditions for a plurality of runs of a recipe, based on the analysis of the wafers produced during the runs within the manufacturing environment, based on determined metrology and yield attributes of the wafers (block 615). For example, the fault detection component 120 could analyze the wafers to determine metrology information and yield information for the wafers, and the fault detection component 120 could group fabrication chamber conditions during each of the plurality of runs (e.g., as good runs or bad runs), based on the analysis of the wafer attributes. Moreover, the fault detection component 120 could consider the time taken to complete each of the runs in grouping the chamber conditions.

At block 620, the fault detection component 120 generates a guard band of sensor data for each of the groups (e.g., good runs, bad runs, etc.). That is, the fault detection component 120 could generate a sensor profile (e.g., a range of values, a pattern of values, etc.) for each sensor and peer group of sensors within the manufacturing environment, for each step of the recipe, and for each of the groups. The fault detection component 120 further generates a statistical table, indicating a relative weight of each sensor or peer group of sensors for each step of the recipe for classifying runs into the respective group (block 625). For example, the fault detection component 120 could determine that a particular sensor matching the corresponding guard band of sensor data for the faulty group is more indicative of a faulty run during a particular step of the recipe, than a gas sensor matching the corresponding guard band of sensor data for the faulty group.

The fault detection component 120 then determines one or more maintenance operations to perform within the manufacturing environment in order to prevent runs from being classified as erroneous or faulty runs (block 630). For instance, upon detecting that the manufacturing environment is producing faulty runs of the recipe, the fault detection component 120 can then determine one or more maintenance operations to perform in order to prevent subsequent runs of the recipe from being faulty. As discussed above, such maintenance operations could include, without limitation, auto-calibrating one or more pieces of manufacturing equipment within the manufacturing environment, running a maintenance operation within the manufacturing environment (e.g., a season and clean recipe), fixing faulty hardware or parts within the manufacturing environment and so on. In the depicted method 600, the fault detection component 120 initiates the determined one or more maintenance operations (block 635).

The fault detection component 120 determines whether subsequent faulty runs of the recipe are being produced within the manufacturing environment (block 640). If the fault detection component 120 determines that non-faulty runs are being produced after the maintenance operations have completed, the method 600 ends. If the fault detection component 120 determines that faulty runs are still being produced, the method 600 returns to block 610, where the fault detection component 120 analyzes a plurality of wafers from the faulty runs to determine metrology and yield information for the wafers. The fault detection component 120 could then repeat this process of grouping wafers, generating the guard bands and ranking the weight of sensors for each step of the recipe, and performing maintenance operations until the fault detection component 120 determines that faulty runs are not being produced within the manufacturing environment. Additionally, the fault detection component 120 can continue to update the data model with updated sensor profile data for each sensor and for each step of the recipe, updated weights of the sensors for each group and each step of the recipe, and so on. Doing so provides an automated, intelligent technique for monitoring and adjusting aspects the manufacturing environment in order ensure non-faulty runs of the recipe without requiring user intervention.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., fault detection component 120) or related data available in the cloud. For example, the fault detection component 120 could execute on a computing system in the cloud and could collect data from a plurality of sensor devices located within a manufacturing environment. The fault detection component 120 could then generate a data model using the collected data and could use the data model to classify subsequent production runs in the manufacturing environment. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:
1. A method, comprising:
monitoring a plurality of runs of a recipe for fabricating one or more semiconductor devices within a manufacturing environment to collect runtime data from a plurality of sensors within the manufacturing environment;
creating a sensor peer group comprising two or more of the plurality of sensors, wherein the values generated by the two or more sensors are correlated, and wherein the two or more sensors have a predefined relationship with one another;
recording, for each sensor peer group value within the collected runtime data, steps of the recipe during which the sensor peer group value was collected;
determining metrology data describing each of the semiconductor devices produced by the plurality of runs of the recipe;
characterizing each of the plurality of runs into a respective one of a plurality of groups, based on the metrology data;
generating a data model, based on the characterization of the plurality of runs, that describes, for each of the plurality of groups, (i) a guard band of sensor peer group data for each respective group and (ii) a relative importance of the sensor peer group in each respective group;
performing a multivariate analysis of additional runtime data collected during at least one subsequent run of the recipe within the manufacturing environment to classify the at least one subsequent run into a first group of the plurality of groups, by determining which guard band of sensor peer group data specified within the data model best fits the additional runtime data;
wherein classifying the at least one subsequent run of the recipe within the manufacturing environment into the first group is further based on the recorded steps for the collected runtime data and an indication of an additional step during which sensor peer group values in the additional runtime data were collected; and upon classifying the at least one subsequent run of the recipe into the first group, outputting for display a report depicting a ranking of sensor peer group based on the additional runtime data and the relative importance of the sensor peer group for the first group within the data model.

2. The method of claim 1, further comprising:
upon classifying the at least one subsequent run of the recipe into the first group:
determining one or more maintenance operations that have historically influenced the classification of runs of the recipe within the manufacturing environment from the first group into a second group; and
performing the one or more maintenance operations within the manufacturing environment, without requiring user interaction, wherein the one or more maintenance operations include at least (i) an auto-calibration operation for one or more pieces of equipment within the manufacturing environment and (ii) initiating a run of a maintenance recipe, distinct from the recipe, within the manufacturing environment.

3. The method of claim 1, wherein determining the metrology data describing each of the semiconductor devices produced by the plurality of runs of the recipe further comprises:
determining an amount of time needed to complete each of the plurality of runs of the recipe; and
analyzing each of the semiconductor devices produced by the plurality of runs of the recipe to determine respective yield and metrology information for the respective semiconductor device, and
wherein characterizing each of the plurality of runs into a respective one of the plurality of groups is further based on the determined amount of time and the analysis of the one or more semiconductor devices fabricated by the respective run.

4. The method of claim 1, wherein the data model further describes, for each of the plurality of groups, a respective weight for each step of the recipe describing a relative importance of the step in indicating the respective group, and wherein outputting for display the report depicting the ranking of the sensor peer group is further based on the described relative importance of each step of the recipe.

5. The method of claim 1, wherein the data model further specifies, for one of the plurality of groups, at least one guard band of sensor peer group data, and wherein performing the multivariate analysis of additional runtime data collected during at least one subsequent run of the recipe within the manufacturing environment to classify the at least one subsequent run into the first group further comprises determining that the at least one guard band of sensor data for the sensor peer group best fits the additional runtime data.

6. The method of claim 1, wherein the predefined relationship comprises a physical proximity between the two or more sensors within the peer group within the manufacturing environment.

7. A system, comprising:
one or more computer processors; and
a memory containing computer program code that, when executed by operation of the one or more computer processors, performs an operation comprising:
monitoring a plurality of runs of a recipe for fabricating one or more semiconductor devices within a manufacturing environment to collect runtime data from a plurality of sensors within the manufacturing environment;
creating a sensor peer group comprising two or more of the plurality of sensors, wherein the values generated by the two or more sensors are correlated, and wherein the two or more sensors have a predefined relationship with one another;
recording, for each sensor peer group value within the collected runtime data, a plurality of steps of the recipe during which the sensor peer group value was collected;
determining metrology data describing each of the semiconductor devices produced by the plurality of runs of the recipe;
characterizing each of the plurality of runs into a respective one of a plurality of groups, based on an analysis of the metrology data;
generating a data model, based on the characterization of the plurality of runs, that describes, for each of the plurality of groups, (i) a guard band of sensor peer group data for each respective group and (ii) a relative importance of the sensor peer group in each respective group;
performing a multivariate analysis of additional runtime data collected during at least one subsequent run of the recipe within the manufacturing environment to classify the at least one subsequent run into a first group, by determining which guard band of sensor peer group data specified within the data model best fits the additional runtime data;
wherein classifying the at least one subsequent run of the recipe within the manufacturing environment into the first group is further based on the recorded steps for the collected runtime data and an indication of an additional plurality of steps during which sensor peer group values in the additional runtime data were collected; and
upon classifying the at least one subsequent run of the recipe into the first group, outputting for display an interface depicting a ranking of the sensor peer group based on the additional runtime data and the relative importance of the sensor peer group for the first group within the data model.

8. The system of claim 7, wherein determining metrology data characterizing each of the plurality of runs into the respective one of the plurality of groups further comprises:
receiving, by way of a user interface, the metrology data characterizing each of the plurality of runs into the respective group, wherein the plurality of groups include at least a group of good runs of the recipe and a group of faulty runs of the recipe.

9. The system of claim 7, wherein determining the metrology data describing each of the semiconductor devices produced by the plurality of runs of the recipe further comprises:
determining an amount of time needed to complete each of the plurality of runs of the recipe; and
analyzing each of the semiconductor devices produced by the plurality of runs of the recipe to determine respective yield and metrology information for the respective semiconductor device, and
wherein characterizing each of the plurality of runs into a respective one of the plurality of groups is further based on the determined amount of time and the analysis of the one or more semiconductor devices fabricated by the respective run.

10. The system of claim 7, wherein the generated data model further describes, for each of the plurality of groups, a respective weight for each of the plurality of steps of the recipe describing a relative importance of the step in indicating the respective group, and wherein outputting for display the interface depicting the ranking of the sensor peer group is further based on the described relative importance of each step of the recipe.

11. The system of claim 7, wherein the data model further specifies, for one of the plurality of groups, at least one guard band of sensor peer group data, and wherein performing the multivariate analysis of additional runtime data collected during at least one subsequent run of the recipe within the manufacturing environment to classify the at least one subsequent run into the first group further comprises determining that the at least one guard band of sensor peer group best fits the additional runtime data.

12. A non-transitory computer-readable medium containing computer program code that, when executed by operation of one or more computer processors, performs an operation comprising:

monitoring a plurality of runs of a recipe for fabricating one or more semiconductor devices within a manufacturing environment to collect runtime data from a plurality of sensors within a manufacturing environment;

creating a sensor peer group comprising two or more of the plurality of sensors, wherein the values generated by the two or more sensors are correlated;

recording, for each sensor peer group value within the collected runtime data, a step of the recipe during which the sensor peer group value was collected;

determining metrology data describing each of the semiconductor devices produced by the plurality of runs of the recipe;

characterizing each of the plurality of runs into a respective one of a plurality of groups, based on an analysis of the metrology data;

generating a data model, based on the characterization of the plurality of runs, that describes, for each of the plurality of groups, (i) a guard bands band of sensor peer group data for each respective group and (ii) a relative importance of the sensor peer group in each respective group;

performing a multivariate analysis of additional runtime data collected during at least one subsequent run of the recipe within the manufacturing environment to classify the at least one subsequent run into a first group, by determining which guard bands of sensor peer group data specified within the data model best fits the additional runtime data;

wherein classifying the at least one subsequent run of the recipe within the manufacturing environment into the first group is further based on the recorded step for the collected runtime data and an indication of an additional step during which sensor values in the additional runtime data were collected; and upon classifying the at least one subsequent run of the recipe into the first group, outputting for display an interface depicting a ranking the sensor peer group based on the additional runtime data and the relative importance of the sensor peer group for the first group within the data model.

13. The non-transitory computer-readable medium of claim 12, wherein determining metrology data characterizing each of the plurality of runs into the respective one of the plurality of groups further comprises:

receiving, by way of a user interface, the metrology data characterizing each of the plurality of runs into the respective group, wherein the plurality of groups include at least a group of good runs of the recipe and a group of faulty runs of the recipe.

14. The non-transitory computer-readable medium of claim 12, wherein determining the metrology data describing each of the semiconductor devices produced by the plurality of runs of the recipe further comprises:

determining an amount of time needed to complete each of the plurality of runs of the recipe; and analyzing each of the semiconductor devices produced by the plurality of runs of the recipe to determine respective yield and metrology information for the respective semiconductor device, and wherein characterizing each of the plurality of runs into a respective one of the plurality of groups is further based on the determined amount of time and the analysis of the one or more semiconductor devices fabricated by the respective run.

15. The non-transitory computer-readable medium of claim 12, wherein the generated data model further describes, for each of the plurality of groups, a respective weight for the step of the recipe describing a relative importance of the step in indicating the respective group, and wherein outputting for display the interface depicting the ranking of the sensor peer group is further based on the described relative importance of each step of the recipe.

16. The non-transitory computer-readable medium of claim 12, wherein the data model further specifies, for one of the plurality of groups, at least one guard band of sensor peer group data, wherein performing the multivariate analysis of additional runtime data collected during at least one subsequent run of the recipe within the manufacturing environment to classify the at least one subsequent run into the first group further comprises determining that the at least one guard band of sensor peer group data.

* * * * *